United States Patent [19]
Boyte, Jr.

[11] Patent Number: 5,646,381
[45] Date of Patent: Jul. 8, 1997

[54] ROOF MOUNTED SOUND HORNS FOR VEHICLES

[75] Inventor: James M. Boyte, Jr., Carthage, N.C.

[73] Assignee: Top Source Technologies, Palm Beach Gardens, Fla.

[21] Appl. No.: 531,222

[22] Filed: Sep. 19, 1995

[51] Int. Cl.$^6$ ...................................................... H05K 5/00
[52] U.S. Cl. .......................... 181/141; 181/152; 181/192
[58] Field of Search .................................. 181/141, 150, 181/152, 144, 179, 187, 188, 189, 192; 381/86, 156, 205; 296/210, 214

[56] References Cited

U.S. PATENT DOCUMENTS

| | | | |
|---|---|---|---|
| 2,165,637 | 7/1939 | Little | 181/150 |
| 3,276,538 | 10/1966 | Guyton et al. | |
| 4,005,761 | 2/1977 | Okamoto et al. | 181/141 |
| 4,056,165 | 11/1977 | Okamoto et al. | |
| 4,099,026 | 7/1978 | Persson et al. | 181/144 X |
| 4,206,830 | 6/1980 | Sohma et al. | |
| 4,493,389 | 1/1985 | Del Rosario | 181/141 X |
| 4,612,530 | 9/1986 | Kurth et al. | |
| 4,673,056 | 6/1987 | Koppelomaki | 181/141 |
| 4,924,962 | 5/1990 | Terai et al. | 181/141 |
| 5,218,175 | 6/1993 | Scarlata | |

Primary Examiner—Khanh Dang

[57] ABSTRACT

An acoustical assembly and methodology for mounting audio speakers 28 in automotive vehicles an acoustical speaker (28) for generating sound waves including a pair of acoustical horns for directing sound in opposite directions from speakers (28) disposed at the center of the roof (12) toward the adjacent edge of the roof (12). The horns define a box-like central section (32) which is generally square in cross section and enclosing the the speakers (28). A tapered section (34) decreases in thickness from the central section (32) laterally in opposite directions to a rectangular cross section. A rectangular exit opening (38) faces generally transversely to the tapered section (34) and an exit section (36) interconnects the tapered section (34) and the exit opening (38) and the exit section (36) extends through a bend to direct the sound from the lateral direction of the tapered section (34) through the bend to a direction transversely to the tapered section (34) and generally at the window. The invention, therefore, includes a method comprising creating sound waves centrally of the roof (12) adjacent one of the edges, conveying the sound waves transversely of the vehicle in opposite directions from the center of the vehicle, and turning the sound waves through a bend and toward the adjacent window just below one of edges.

12 Claims, 2 Drawing Sheets

ROOF MOUNTED SOUND HORNS FOR VEHICLES

TECHNICAL FIELD

The subject invention relates to an acoustical assembly and methodology for mounting audio speakers in automotive vehicles.

BACKGROUND OF THE INVENTION

Automotive vehicles typically include one or more speakers positioned in spaced relationships within the vehicle to coactively provide a desired sound mix within the vehicle body. In sedan type vehicles, a pair of speakers are typically mounted in the shelf behind the rear seat, as disclosed in U.S. Pat. No. 4,206,830 to Sohma et al. Some systems include acoustical conduits or horns to improve sound quality. One such an assembly is shown in U.S. Pat. No. 5,218,175 to Scarlata wherein the conduit extends from a speaker outside the compartment behind the rear seat, under the rear seat to an outlet directed at the foot space in front of the rear seat. Still other systems mount the speakers to the roof of the vehicle about the interior thereof, as disclosed in U.S. Pat. No. 4,056,165 to Okamoto et al. Yet other systems include conduits and speakers mounted in dashboard or instrument panel with the emanating sound directed toward the windshield, as disclosed in U.S. Pat. Nos. 3,276,538 to Guyton et al and 4,612,530 to Kurth et al..

SUMMARY OF THE INVENTION AND ADVANTAGES

An automotive vehicle comprising a body having a roof having a forward and rearward edges. An instrument panel is disposed beneath the forward edge of the roof and a windshield window is disposed between the forward edge of the roof and the instrument panel. In addition, a rear window disposed below the rearward edge of the roof. The system is characterized by an acoustical speaker mounted to the roof adjacent one of its edges, and an acoustical horn directing sound from the speaker forwardly toward the adjacent edge of roof toward the adjacent window.

The invention also includes a method of orienting a sound system in an automotive vehicle having a roof with front and rear edges at the tops of the windshield and rear windows respectively, the method comprising the steps of; creating sound waves centrally of the roof adjacent one of the edges, conveying the sound waves transversely of the vehicle in opposite directions from the center of the vehicle, and turning the sound waves through a bend and toward the adjacent window just below the one of the edges.

The subject invention frees up vehicle packaging space for other features, such as airbags, and maximizes audio performance while utilizing relatively inexpensive but efficient speakers tuned to a unique conduit or horn correlated with location within the vehicle body.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a perspective view of an acoustical conduit or horn and speaker assembly constructed in accordance with the subject invention; and FIG. 4 is a longitudinal cross sectional view of the assembly shown in FIG. 3.

DETAILED DESCRIPTION OF THE PREFERRED EMBODIMENT

Figure 1:
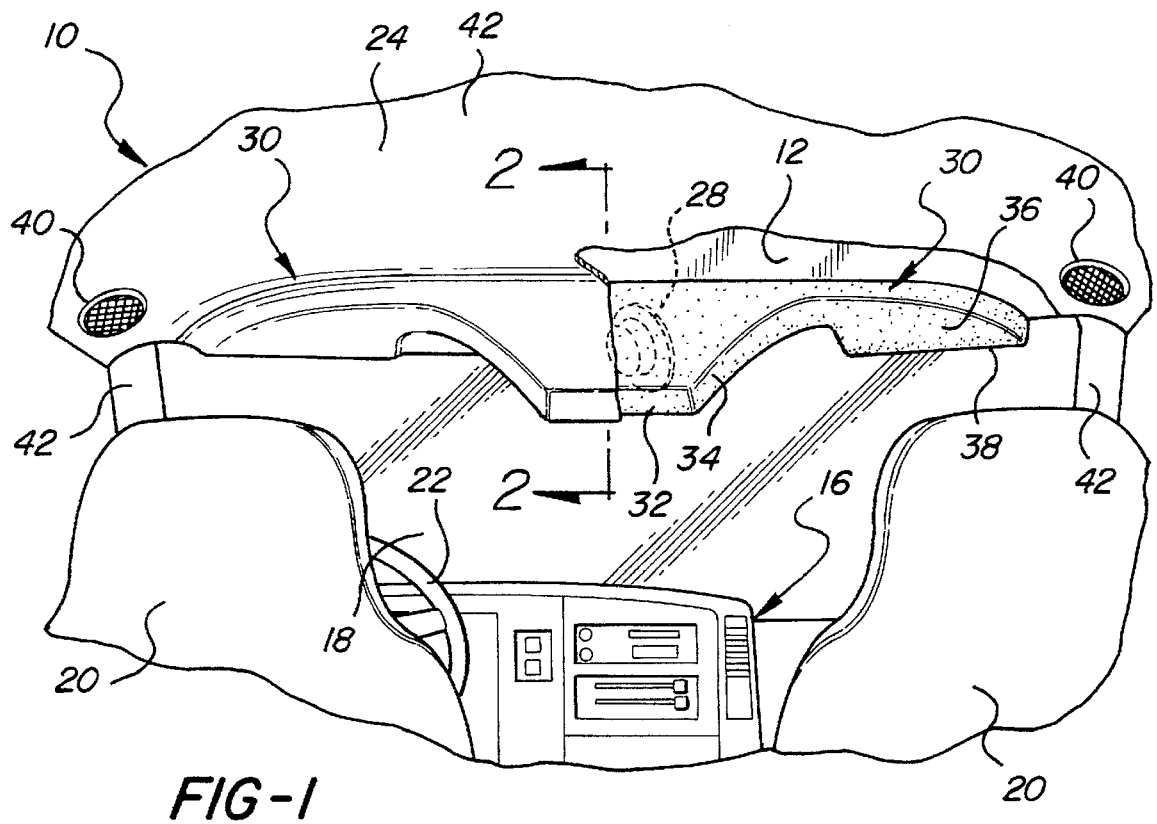
FIG. 1 is a fragmentary view from behind the front seats in an automotive vehicle showing the sound system of the subject invention mounted in the headliner above the windshield window.
Figure 2:
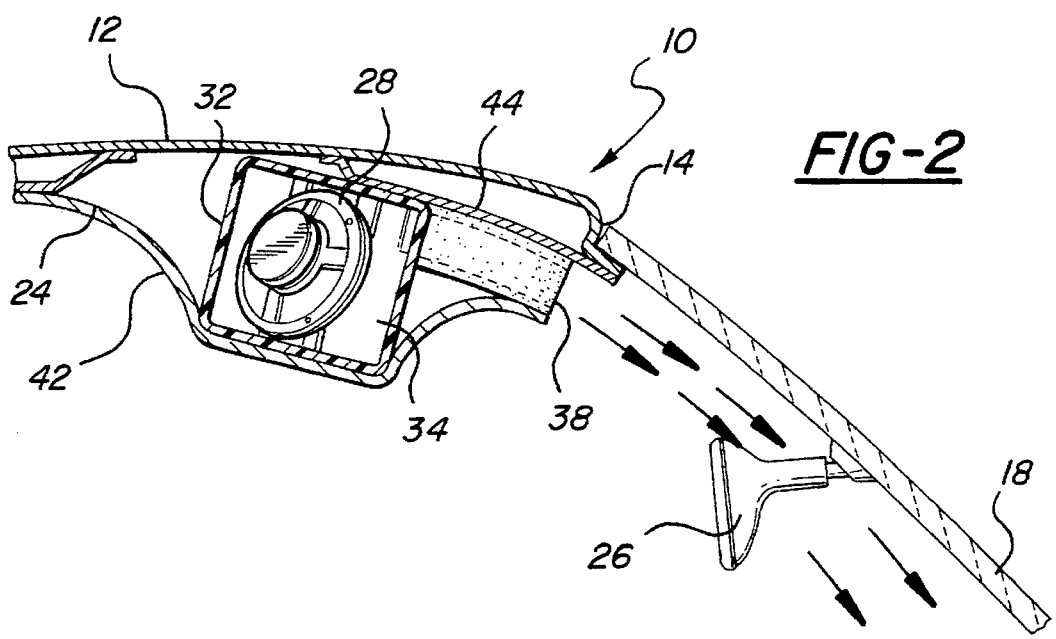
FIG. 2 is a fragmentary cross sectional view taken substantially along line 2—2 of FIG. 1.
Figure 1:
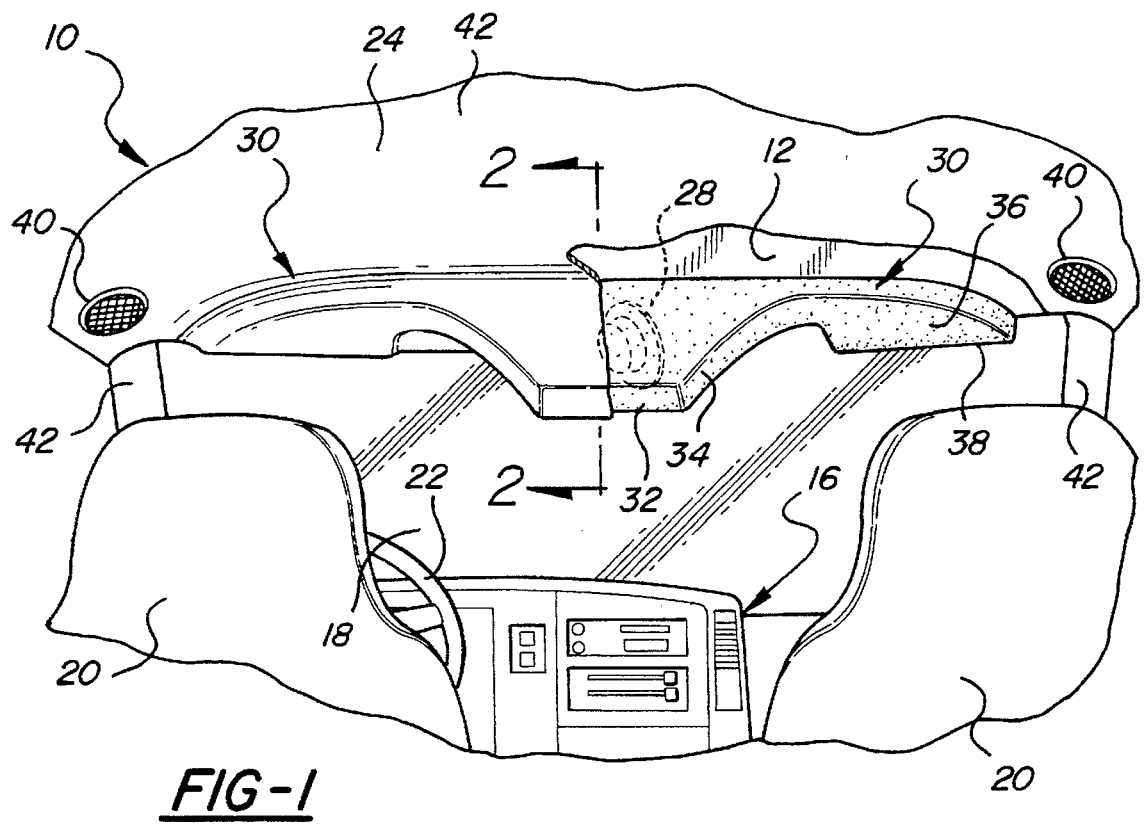
Figure 2:
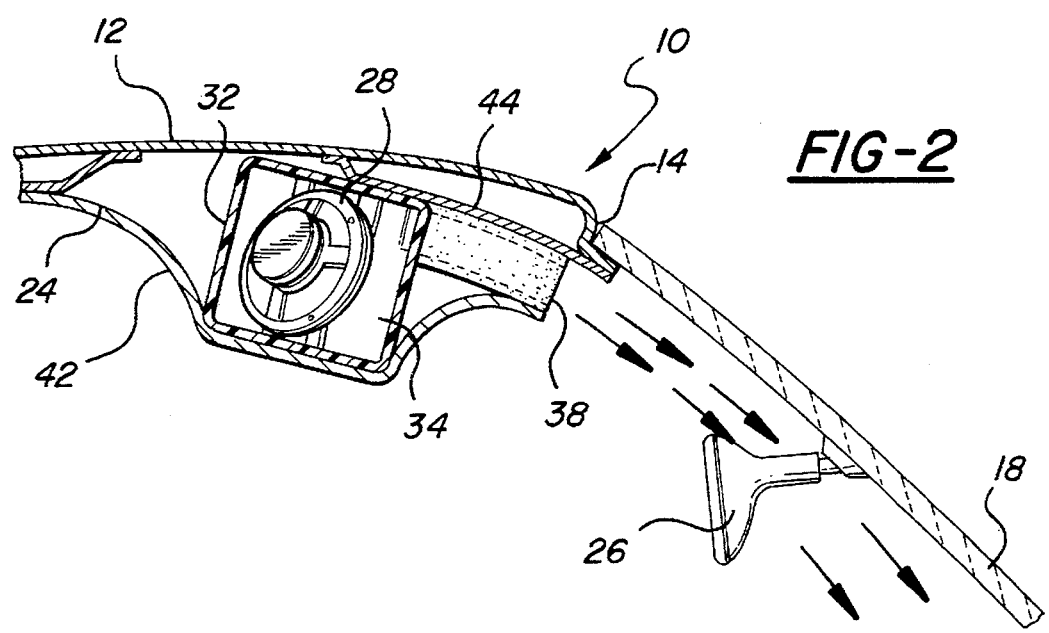
Figure 1:
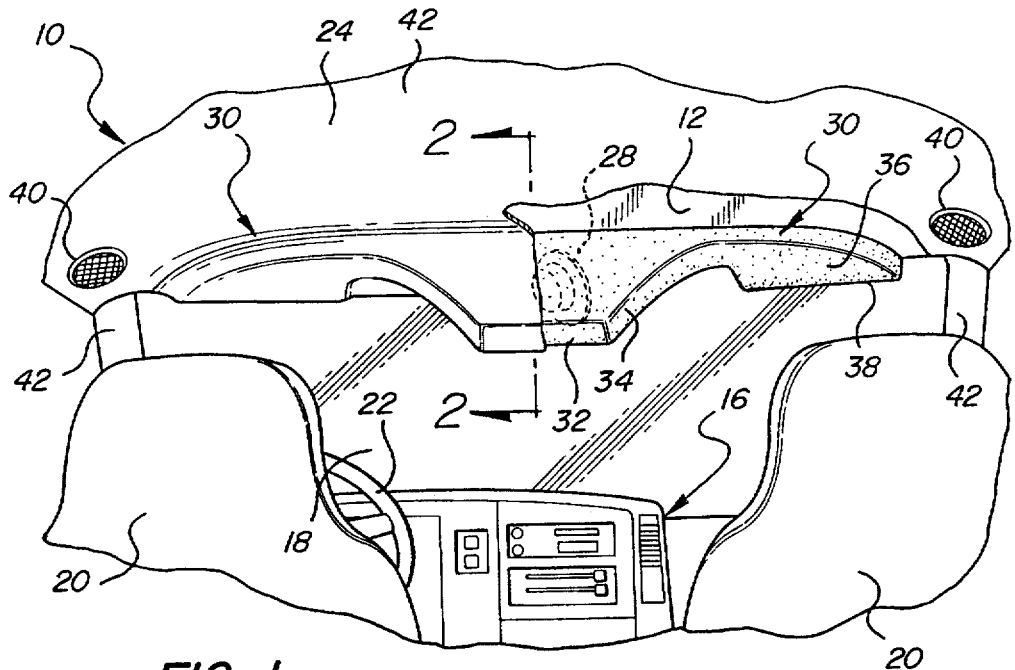
Figure 2:
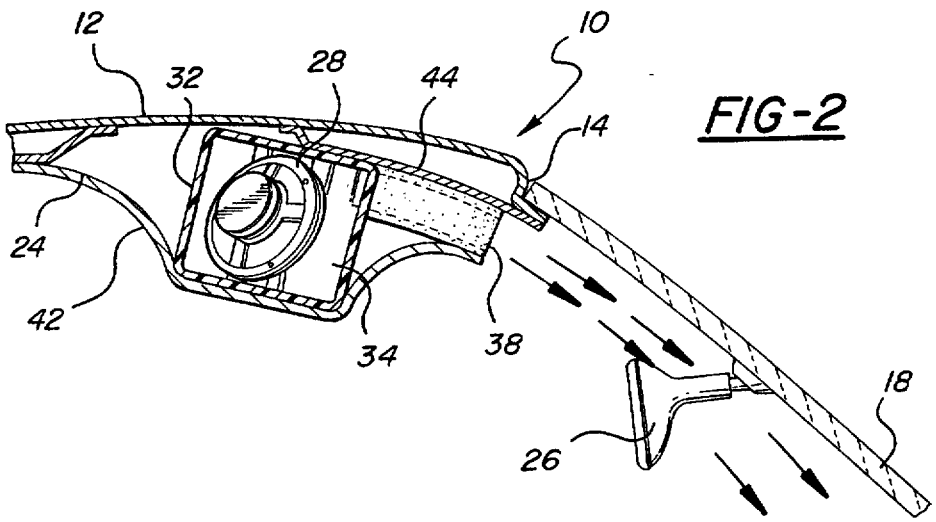

Referring to the Figures, wherein like numerals reference like or corresponding parts throughout the several views, an automotive vehicle is generally shown at 10 in FIG. 1 and 2. The automotive vehicle 10 comprises a body having a roof 12 with forward and rearward edges, the forward edge being shown at 14. An instrument panel, i.e., dashboard, generally indicated at 16, is disposed beneath the forward edge 14 of the roof 12. A windshield window 18 is disposed between the forward edge 14 of the roof 12 and the instrument panel 16. In a similar fashion, a rear window is disposed below the rearward edge of the roof 12, as is well known.

As is also well known in the art, the vehicle 10 includes front seats 20, a steering wheel 22, and a headliner 24. A rearview mirror 26 is mounted in close proximity to the interior surface of the windshield window 18 and just below the front edge 14 of the roof 12.

A pair of acoustical speakers 28 are mounted to the roof 12 adjacent one of the front 14 or rear edges thereof. The speakers 28 are disposed centrally of the vehicle, i.e., on the longitudinal axis of the vehicle, said another way, aligned with the rearview mirror 26. Each speaker 26 is directed toward the side of the vehicle body.

A pair of acoustical horns, each generally indicated at 30, direct sound from each speaker 28 toward the adjacent edge 14 of the roof 12. The pair of the horns 30 extend from the speakers 28 transversely to the longitudinal axis of the vehicle 10. The horns 30 define a box-like central section 32 enclosing the speakers 28, which central section 32 is generally square in cross section, as best viewed in FIG. 2. Each of the horns 28 includes a tapered section 34 decreasing in thickness from the central section 32 laterally of the vehicle 10 to a rectangular cross section at an exit section 36. Each horn also includes a rectangular exit opening 38 at the end of each exit section 36 and facing generally transversely to the tapered section 34. Each exit section 35 interconnects the adjacent tapered section 34 and its associated exit opening 38 extends through a ninety degree bend to direct the sound waves from the lateral direction of the tapered section 34 through the bend to a direction longitudinally of the vehicle 10 and toward the adjacent window 18.

At least one tweeter speaker 40 is disposed adjacent the exit opening 38 of each horn at each side of the vehicle 10. In the embodiment illustrated, the tweeters are mounted to the roof immediately above the pillars 42. Alternatively, the tweeters could be mounted in the exit sections 36 of the horns, internally or externally, but so the two horns and speakers 28 and 40 may be shipped and installed as a unit.

The vehicle 10 includes the typical headliner 42 adjacent the roof 12. As illustrated the headliner 42 covers the horn assembly but the horns may be integral with the headliner 42. The horns can be molded of a fiber board type material, i.e., a material which is self supporting and capable of forming an acoustical conduit.

The, therefore, includes a method of orienting a sound system in an automotive vehicle 10 having a roof 12 with front and rear edges at the tops of the windshield window and rear window respectively, the method comprising the steps of; creating sound waves centrally of the roof 12 adjacent one of the edges, conveying the sound waves transversely of the vehicle 10 in opposite directions from the center of the vehicle 10, and turning the sound waves through a bend and toward the adjacent window just below the one of the edges. The conveying of the sound waves transversely of the vehicle 10 may be further defined as conveying the waves in a volume 34 which has a diminishing cross section from the center 32 toward the sides of the roof 12. More specifically, the cross section is diminished from a square 32 to a thin rectangular exit opening 38. The method may also include disposing a tweeter speaker 40 adjacent each exit opening 38.

As illustrated in FIG. 2, the horn assembly is secured to a bracket 44 which depends from the roof. The attachment may be by fasteners, glue, Velcro, or the like.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An automotive vehicle (10) comprising;
   a body having a roof (12) having forward and rearward edges,
   an instrument panel (16) beneath said forward edge (14) of said roof (12),
   a windshield window (18) disposed between said forward edge of said roof (12) and said instrument panel (16),
   a rear window disposed below said rearward edge of said roof (12),
   an acoustical speaker (28) mounted to said roof (12) adjacent one of said edges thereof, and
   an acoustical horn extending from and receiving sound from said speaker and directing sound from said speaker (28) toward the adjacent edge of said roof (12).

2. A vehicle as set forth in claim 1 including a pair of said speakers (28) mounted to said roof (12) at the longitudinal axis of said vehicle (10) and a pair of said horns extending from said speakers (28) transversely to said vehicle.

3. A vehicle as set forth in claim 2 wherein said horns have a box-like like central section (32) and said speakers (28) are mounted within the box-like central section (12) of the horns.

4. A vehicle as set forth in claim 3 wherein said central section (32) is generally square in cross section.

5. A vehicle as set forth in claim 3 wherein each of said horns includes a tapered section (34) decreasing in thickness from said central section (32) laterally of the vehicle to a rectangular cross section.

6. A vehicle as set forth in claim 5 wherein each of said horns includes a rectangular exit opening (38) facing generally transversely to said tapered section (34) thereof and an exit section (36) interconnecting said tapered section (34) and said exit opening (38), said exit section (36) extending through a bend to direct the sound from the lateral direction of the tapered section (34) through the bend to a direction longitudinally of the vehicle.

7. An acoustical speaker (28) assembly for mounting to the roof (12) of an automotive vehicle, said assembly comprising;
   an acoustical speaker (28) located at the longitudinal center of the roof (12) for generating sound waves, and
   a pair of acoustical horns extending from and receiving sound from said speaker and directing sound in opposite directions from said speaker (28).

8. An assembly as set forth in claim 7 wherein said horns have a box-like central section (32) and said speaker (28) is mounted within the box-like central section (32) of the horns.

9. An assembly as set forth in claim 7 wherein said central section (32) is generally square in cross section.

10. An assembly as set forth in claim 9 wherein each of said horns includes a tapered section (34) decreasing in thickness from said central section (32) laterally in opposite directions to a rectangular cross section.

11. An assembly as set forth in claim 10 wherein each of said horns includes a rectangular exit opening (38) facing generally transversely to said tapered section (34) thereof and an exit section (36) interconnecting said tapered section (34) and said exit opening (38), said exit section (36) extending through a bend to direct the sound from the lateral direction of the tapered section (34) through the bend to a direction transversely to the tapered section (34).

12. An assembly as set forth in claim 11 including at least one tweeter speaker (28) disposed adjacent the exit of each horn.

\* \* \* \* \*

UNITED STATES PATENT AND TRADEMARK OFFICE
CERTIFICATE OF CORRECTION

PATENT NO. : 5,646,381

DATED : July 8, 1997

INVENTOR(S) : James M. Boyte, Jr.

It is certified that error appears in the above-identified patent and that said Letters Patent is hereby corrected as shown below:

In the drawings:
    Delete Drawing Sheet 2 of 2, and substitute therefor the Drawing Sheet, consisting of Figs. 3 and 4, as shown on the attached page.

Signed and Sealed this

Third Day of August, 1999

Attest:

Q. TODD DICKINSON

Attesting Officer

Acting Commissioner of Patents and Trademarks